United States Patent [19]

Anderson, Jr. et al.

[11] 3,800,295

[45] Mar. 26, 1974

[54] ASYNCHRONOUSLY OPERATED MEMORY SYSTEM

[75] Inventors: Robert D. Anderson, Jr., Colchester; Gerold B. Hasler; Ralph W. Kirby, both of Burlington; Kraig R. White, Milton, all of Vt.

[73] Assignee: International Business Machines Corporation, Armonk, N.Y.

[22] Filed: Dec. 30, 1971

[21] Appl. No.: 214,364

[52] U.S. Cl. .......................... 340/173 DR, 340/173 R

[51] Int. Cl. .......................... G11c 7/00, G11c 11/34

[58] Field of Search... 340/173 R, 173 CA, 173 DR; 307/238

[56] References Cited

UNITED STATES PATENTS

| | | | |
|---|---|---|---|
| 3,705,392 | 12/1972 | Appelt | 340/173 R |
| 3,665,422 | 5/1972 | McCoy et al. | 340/173 R |
| 3,599,180 | 8/1971 | Rubinstein | 340/174 |
| 3,760,379 | 9/1973 | Nibby, Jr. et al. | 340/173 DR |

OTHER PUBLICATIONS

Electronics, "Random-Access MOS Memory Packs More Bits to the Chip" by Boysel et al., 2/70, p.–109-115.

*Primary Examiner*—Stanley M. Urynowicz, Jr.
*Attorney, Agent, or Firm*—Howard J. Walter, Jr.

[57] ABSTRACT

A memory system includes a plurality of dynamic storage memories, each controlled by its own independent refreshing means, and a processor capable of interacting with a selected memory when access to the selected memory through the processor is desired. This system allows the refresh interval for each memory to be adjusted independent of the system to the extent of the extrinsic capability of its individual characteristics.

5 Claims, 4 Drawing Figures

ASYNCHRONOUSLY OPERATED MEMORY SYSTEM

FIELD OF THE INVENTION

This invention relates to a memory system in which a plurality of memory units are each connected to a common interface. More particularly, the invention relates to such a memory system in which a plurality of independent memory basic storage modules (BSM's) are each connected to a processor for operation, typically in a digital electronic data processing machine. The improved memory system of this invention is directed to increasing the efficiency of such a system by allowing the memory units to operate on the basis of timing suited to the characteristics of each memory unit.

DESCRIPTION OF THE PRIOR ART

Memory systems consisting of a plurality of dynamic storage memory BSM's connected to and controlled by a processor are known in the art. For example, Beausoleil et al, commonly assigned application Ser. No. 889,435, now U.S. Pat. No. 3,648,255, discloses such a system. A dynamic storage memory requires that information stored in it must be periodically refreshed to avoid loss of the information. This refresh can be accomplished either by having the information recirculate, as in the case of a dynamic storage shift register, or by reading the information out of the memory periodically and writing it back in, as in a dynamic storage random access memory.

Beausoleil et al disclose a dynamic storage shift register memory system in which refresh is carried out in unison by having the information recirculate in the memories synchronously under control of a single refresh control. Such a system has and should find wide application where a number of memories have essentially the same interval of time during which information can be stored in the memories without requiring refresh and essentially the same other timing requirements. However, a limitation of such a synchronously operated system is that it is not well suited for use with memories having different timing characteristics, such as different intervals of time for which information may be stored in the memories without requiring refresh, different access times, or the like. Such refresh interval differences can arise either from differences in environment of the memories (e.g., proximity to cooling means) or from systems which are evolutionary in nature and can have later versions of memories added to or replace existing memory units in the system. With synchronous operation, the refresh or other timing interval for all of the memories in the system must be based on the least favorable timing characteristic, e.g., the memory having the shortest interval for which information can be stored in the memory without requiring refresh.

This limitation becomes more and more severe with the advent on a large scale of integrated circuit memory technology, particularly field effect transistor (FET) dynamic storage memories. The refresh interval required for such dynamic storage memories is likely to vary by 100 percent or more based on temperature differences between memory BSM's in a typical data processing system environment. The limitations of a synchronously operated memory system further increase in significance with the development of systems capable of change on an evolutionary basis, rather than a computer generation concept. The computer generation concept envisions complete replacement of a data processing system to incorporate new technology or a larger system. The evolutionary concept, on the other hand, permits the addition of additional memory BSM's to give a larger system to meet a user's increased data processing requirements. It also permits a user's system to be updated in accordance with technological advances by replacement of individual parts of the system, such as memory BSM's. Given a technology moving as rapidly as present day integrated circuit memory technology, replacement of individual BSM's with more advanced BSM's has significant memory system implications.

A further limitation of systems having a single refresh control is that failure of the refresh control means that the entire memory system becomes inoperative.

SUMMARY OF THE INVENTION

Accordingly, it is an object of this invention to provide a memory system capable of adjusting to different operating characteristics of memory units in the system caused by their environment.

It is another object of the invention to provide a memory system in which advances in memory technology may be incorporated in the system by replacement of or the provision of additional memory units, without replacing the entire system.

It is a further object of the invention to provide a memory system which is capable of utilizing a plurality of memory units of a given type having different timing characteristics.

It is still another object of the invention to provide a memory system including memories of a given type with different timing capabilities in which operation of the memory as a whole is not limited by the least favorable timing capability.

It is a still further object of the invention to provide a memory system including a plurality of memory units in which different timing relationships are used based on optimum timing for each memory unit.

It is yet another object of the invention to provide a dynamic storage memory system in which failure of a circuit controlling refresh will still allow the system to continue operation at reduced capacity.

The attainment of these and related objects may be achieved with an asynchronously operated memory system. Such a system includes a plurality of memory units of a given type, such as recirculating shift register memory units or random access memory units, having a timing characteristic that varies from one to another of the units. A common interface capable of interacting with the memory units, such as a processor, is provided, to which the plurality of memory units are connected. An independent timing means controls each memory unit when it is not being accessed by the common interface. The timing characteristics of the timing means is determined by a timing characteristic of the particular memory unit being controlled by it. Means is provided for controlling a particular memory relative to its associated independent timing means and the common interface. This means may either simply determine availability of a particular memory unit or assume control over it when an access is desired. A determination of availability is usually sufficient in the case of a random access memory. A shift register memory usually requires a more complex arrangement, and the means therefore preferably assumes control of such a memory.

This invention, though not limited thereto, is particularly adapted for use with dynamic storage memories, which require periodic refreshing of information stored in them. When incorporated in such a memory, the present invention allows the refresh interval for memory units not requiring refreshing as often as other memory units to be adjusted in accordance with the requirements of the particular unit. Thus, memory units located further away from cooling means in a data processing system can be refreshed more often than units located near the cooling means. Evolution of a memory system is permitted through additional or replacement memory units, without requiring replacement of all memory units or operation of all memory units with refresh governed by the memory unit having the shortest required refresh interval.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
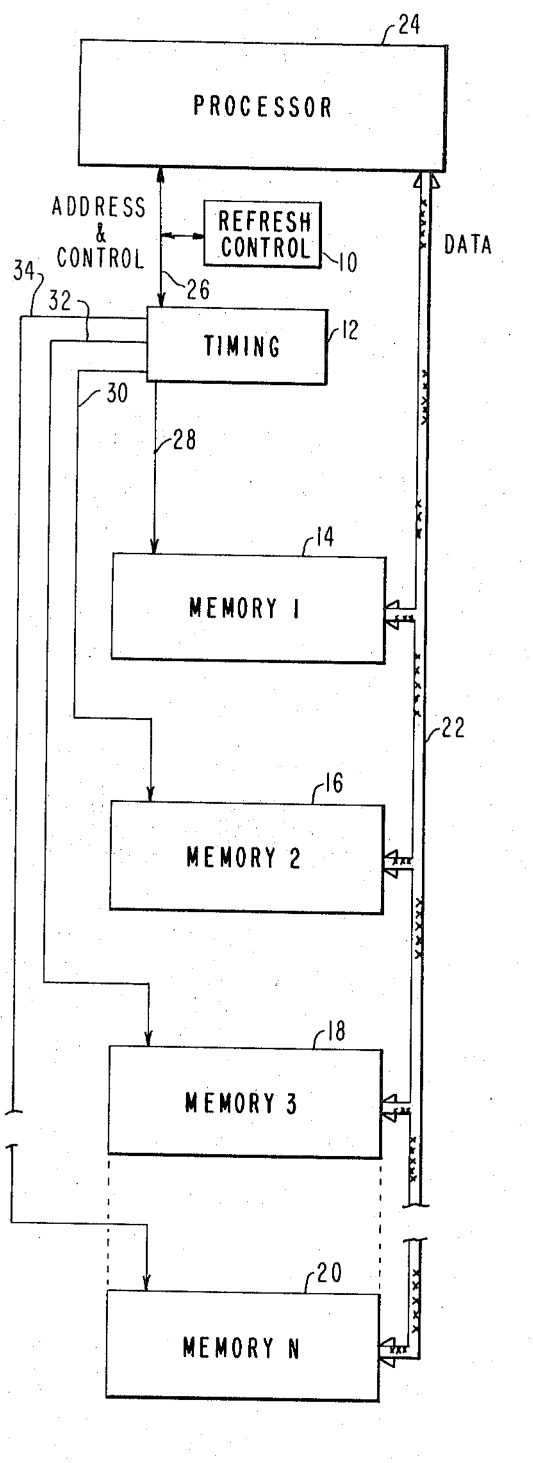
FIG. 1 (PRIOR ART)
FIG. 1 is a block diagram of a generalized prior art memory system.

Turning now to the drawings, more particularly to FIG. 1, there is shown a prior art memory system in which a single refresh control 10 and timing means 12 are used with memory units 14, 16, 18 and 20. Data bus 22 connects each memory 14, 16, 18 and 20 to processor 24, which may be a central processing unit (CPU) of a data processing machine, to allow flow of data from the memories to the processor and vice versa. Address and control line 26 connects processor 24 to refresh control 10 and timing means 12. Timing means 12 is, in turn, connected to each of memory units 14, 16, 18 and 20 by lines 28, 30, 32 and 34, respectively.

In operation, information is supplied on data bus 22 from memory 14, 16, 18 or 20 to processor 24 by supplying a command pulse on line 26 to timing means 12, which supplies readout pulses on line 28, 30, 32 or 34 to read out the information. Memories 14, 16, 18 and 20 must be periodically refreshed to prevent loss of information stored in them. Refresh of these memories is carried out in unison or synchronously through provision of an appropriate command on line 26 from refresh control 10, which initiates the appropriate refresh pulses on lines 28, 30, 32 and 34. Bearing in mind that memory units 14, 16, 18 and 20 may be either recirculating shift registers or dynamic storage random access memories, the actual refresh is accomplished by the recirculation of the information in the shift registers or by reading out the information in random access memories periodically, then returning it to its original storage location. In the case of a random access memory, access to the memory for purpose of reading new information into it or reading out existing information is interrupted for the duration of the refresh operation. In the case of a shift register memory, refresh is accomplished by relatively slow cycling of the information in the shift registers, and information is read into or out of the shift registers by increasing the circulation rate during reading in or reading out.

Figure 2:
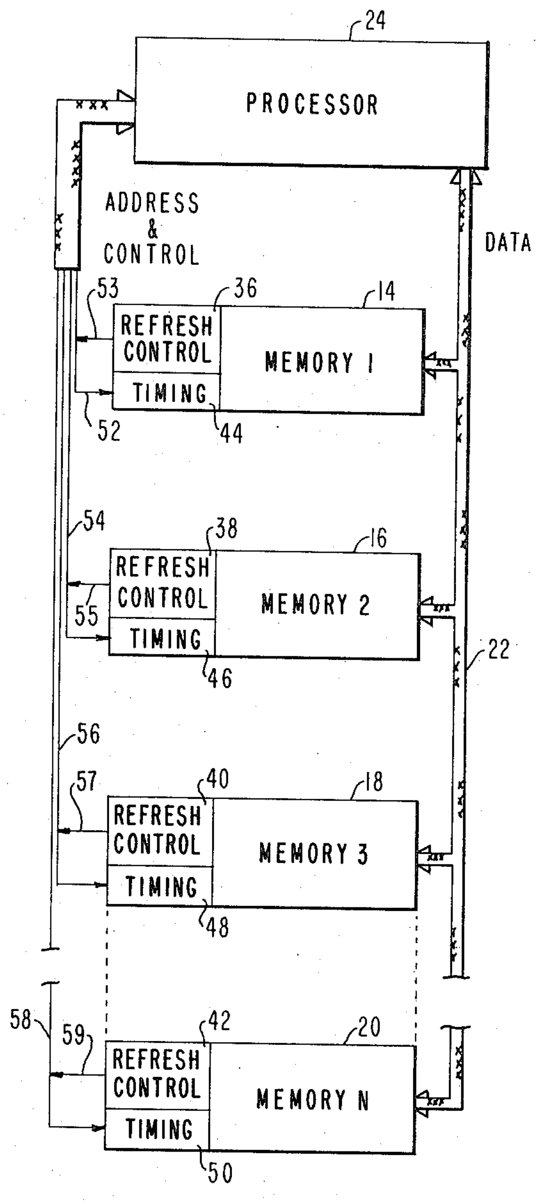
FIG. 2 is a block diagram of a generalized memory system incorporating the invention.

FIG. 2 is a generalized schematic representation of a memory system incorporating the invention and includes a similar arrangement of memory units 14, 16, 18 and 20 connected by data bus 22 to processor 24. In FIG. 2, each memory unit 14, 16, 18 and 20 has its own refresh control 36, 38, 40 and 42 and timing means 44, 46, 48 and 50, respectively. Refresh control 36 and timing means 44 are connected to processor 24 by address and control lines 52 and 53. Similarly, refresh control 38 and timing means 46, refresh control 40 and timing means 48, and refresh control 42 and timing means 50 are connected to processor 24 by address and control lines 54 and 55, 56 and 57, and 58 and 59, respectively. In operation, independent refresh controls 36, 38, 40 and 42 for memory units 14, 16, 18 and 20, respectively, provide commands to timing means 44, 46, 48 and 50 as needed for refresh to take place. If memory unit 14 is closer to a cooling unit (not shown) for the system or is a more advanced integrated circuit memory than, for example, memory unit 20, refresh control 36 need initiate refresh of memory unit 14 less often than refresh control 42 initiates refresh of memory 20.

As in the case of FIG. 1, if memory units 14, 16, 18 and 20 in FIG. 2 are random access memories, information cannot be written in or read out of the memories while refresh is taking place. With shift register memories, recirculation of information stored in the memories is carried out at a more rapid rate during reading and writing of information.

Figure 3:
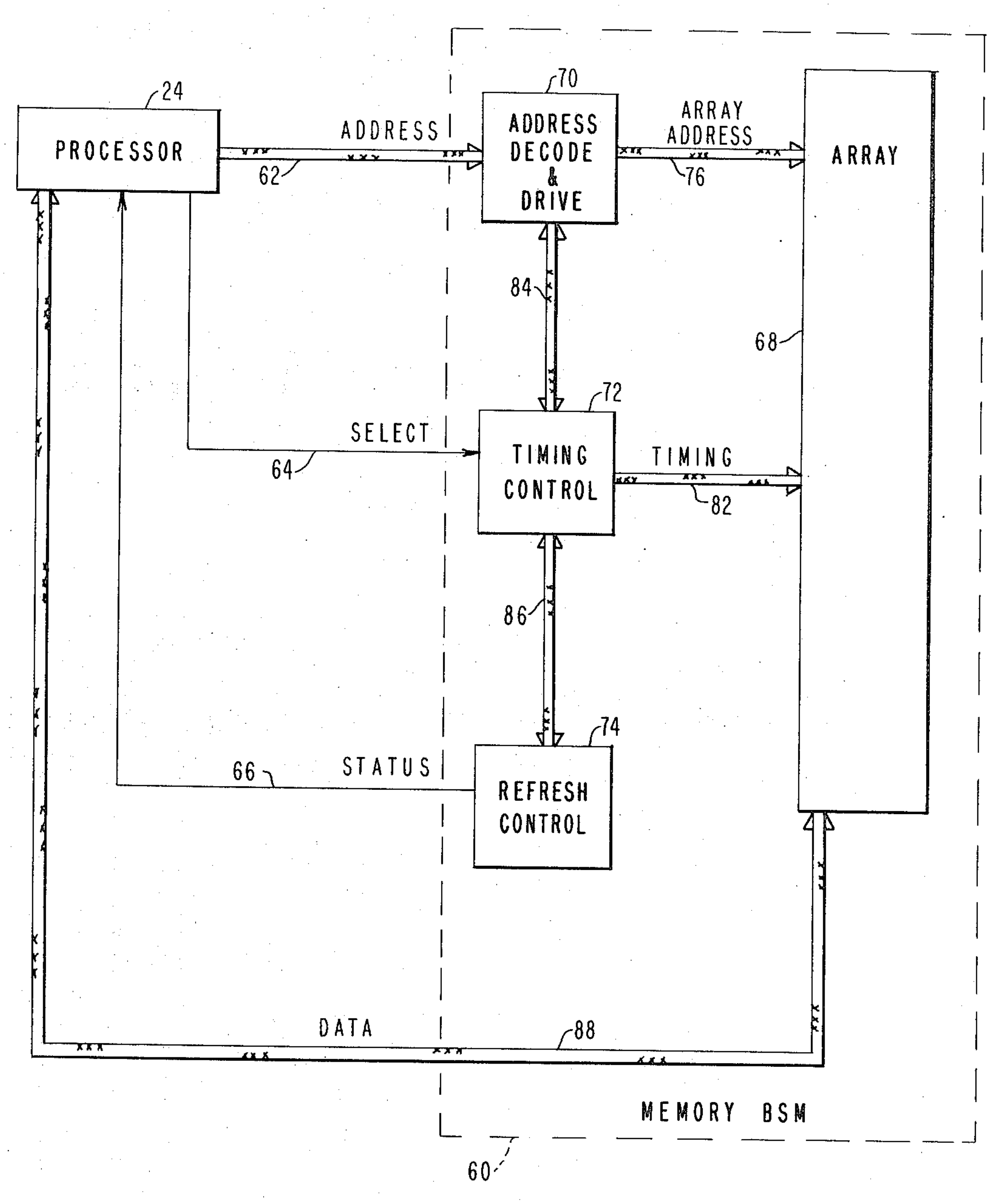
FIG. 3 is a block diagram of a portion of a dynamic storage random access memory system embodiment of the invention.

FIG. 3 shows details of a random access memory embodiment of a system in accordance with the invention. As in FIGS. 1–2, the system includes a processor 24. A memory basic storage module (BSM) 60 is shown connected to processor 24 by address bus 62, select line 64, and status line 66. An actual system would contain additional memory BSM's, each connected to processor 24 by an address bus and select and status lines, to give a system such as is shown in FIG. 2. For simplicity, only one BSM 60 has been shown in FIG. 3.

BSM 60 includes a random access memory array 68, address decode and drive means 70, timing control 72 and refresh control 74. Address decode and drive means 70 is connected to array 68 by array address bus 76. Timing control means 72 is connected to array 68 by timing bus 82. Address decode and drive means 70 and refresh control means 74 are connected to timing control means 72 by busses 84 and 86, respectively. Data bus 88 allows transfer of data to and from array 68 through processor 24.

Random access memory array 68 typically contains a plurality of integrated circuit chips each containing 2,000 or 8,000 dynamic storage FET memory cells. Such memory cells are well known in the art and are exemplified by, for example, Dennard in commonly assigned U.S. Pat. No. 3,387,286. Address decode and drive means 70 also includes elements well known in the art. Timing control means 72 and refresh control means 74 are essentially controllable pulse sources, which provide pulses necessary to operate the storage array, including its refreshing.

In operation, processor 24 determines whether information will be read or written into BSM 60. An address command on bus 62 is sent to address decode and drive means 70 and a select pulse on line 64 to timing control means 72. The time required to store or obtain data takes different amounts of time, depending on the status of the array. Information on the status of the array is supplied to processor 24 from refresh control 74 on line 66.

Refresh control 74 periodically supplies pulses on bus 86 to timing control 72 at a rate depending on the length of time information may be stored at a given location in array 68 without requiring refreshing. Refresh control 74 also increments the address to be refreshed and supplies this to address decode and drive means 70 through timing control 72 on busses 86 and 84, and supplies the refresh pulse on bus 82 to memory array 68. During refresh, a desired access is delayed to complete refreshing, then data may be read out or written in on data bus 88 through application of the required pulses to array 68 through address decode and drive means 70 in a conventional manner.

In a complete system, additional memory BSM's each have their own independent refresh control, which supplies pulses to cause refreshing of its associated memory array at a rate determined by the characteristics of the array. These pulse rates may vary substantially, from BSM to BSM, and there need not be any correlation between the refresh rate of different BSM's.

Since information is stored in random access array 68 in a particular location, the embodiment of FIG. 3 represents a relatively simple asynchronously operating system. A more complex system is required in the case of a dynamic storage shift register memory, in which the information is constantly recirculating in order to maintain its viability. Such a system is shown in FIG. 4.

Figure 4:
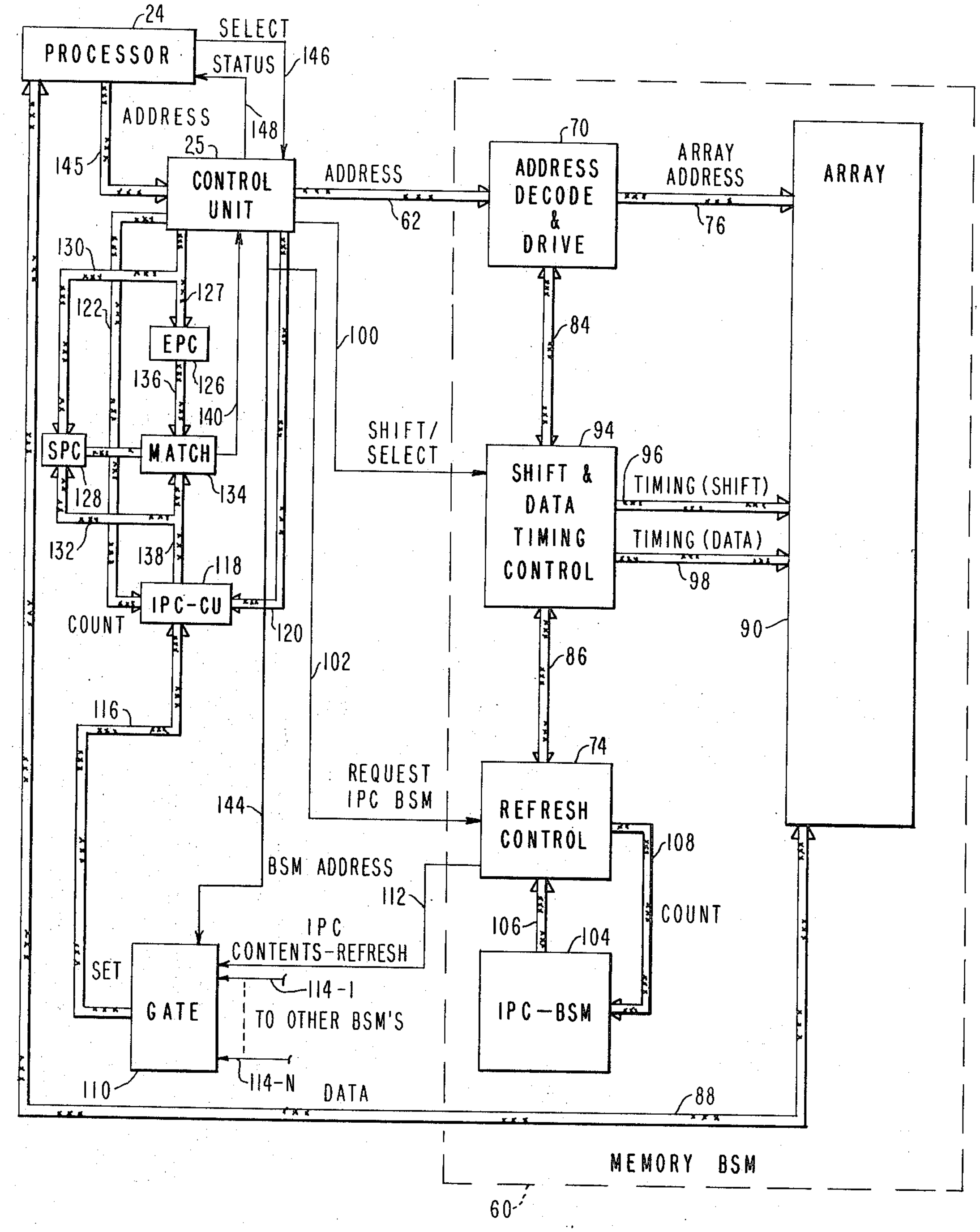
FIG. 4 is a block diagram of a portion of a dynamic recirculating shift register memory system embodiment of the invention.

The embodiment of FIG. 4 includes a processor 24 to which is connected a plurality of memory BSM's, with only memory BSM 60 being shown, through a control unit 25. Memory array 90 consists of a plurality of recirculating dynamic storage shift registers in a two dimensional array. Further details on the nature of such an array are available in the above-mentioned Beausoleil et al application. The shift registers may be made of serially interconnected FET memory cells, for example, as disclosed by Hoffman in application Ser. No. 6,496, filed Jan. 28, 1970, now U.S. Pat. No. 3,648,065 or Hoffman et al, application Ser. No. 6,497, filed Jan. 28, 1970, now U.S. Pat. No. 3,648,063.

As in FIG. 3, memory BSM 60 contains an address decode and drive means 70 connected to memory array 90 by array address bus 76 and to control unit 25 by address bus 62. Shift and data timing control means 94 is connected to memory array 90 by shift timing bus 96 and data timing bus 98, to control unit 25 by shift or select line 100, and to address decode and drive means 70 by bus 84. Refresh control 74 is connected to control unit 25 by request IPC BSM line 102 and to shift and data timing control 94 by bus 86. An internal position counter (IPC) 104 for the BSM, which serves to keep track of the recirculation position of the shift registers in array 90, is connected to refresh control 74 by bus 106 and by count bus 108. Gate 110 is provided to receive the contents of IPC 104 from refresh control means 74 on line 112. In the same manner, other BSM's (not shown) in addition to memory BSM 60 are connected to gate 110 by lines 114–I to lines 114–N. Gate 110 is connected by bus 116 to IPC 118 for the control unit 25. IPC 118 is in turn connected to control unit 25 by busses 120 and 122. The function of IPC 118 is to keep track of the location undergoing refresh or accessing at the time control unit 25 has control over a particular BSM, such as BSM 60. An external position counter 126 is connected to control unit 24 by bus 127 to receive a starting address of a data transfer. A specific position counter 128 is connected to external position counter 126 by bus 130 and to IPC 118 by bus 132. A match means 134 is connected to external position counter 126, specific position counter 128 and IPC 118 by busses 136, 132, and 138, and to control unit 25 by line 140. Control unit 25 is connected to gate 110 by BSM address line 144. Control unit 25 is connected to processor 24, typically a central processing unit of an electronic digital data processing machine, by address bus 145, select line 146, and status line 148.

In operation, processor 24 selects control unit 25 from control units for this and other memory systems capable of interacting with processor 24 and queries its status by a select command on line 146 and a status inquiry on line 148. A starting address for data transfer is supplied on bus 145 to control unit 25. The presence of this address initiates a command from control unit 25 to refresh control 74 on line 102 for the position of IPC 104. This position is available in refresh control 74 through interaction of IPC 104 and refresh control 74 through busses 108 and 106. This position is supplied on line 112 to gate 110 and is then gated by the same command pulse as supplied on line 102, but supplied on line 144. After the position bits have been transferred to internal position counter 118 through bus 116, the contents of specific position counter 128 are set equal to the contents of IPC 118. Control unit 25 is now ready to assume control of memory BSM 60. External position counter 126 is now loaded from control unit 25 with the starting address of the information to be read in or read out of memory BSM 60. Appropriate commands on line 100 to shift information in array 90 through shift and data timing control 94 are supplied, and specific position counter 128 is incremented by update of the location in IPC 104, and hence update of the contents of internal position counter 118. This sequence is continued until the external position counter 126 and the specific position counter 128 match each other. The transfer can now be performed from or to the shift register.

After the data transfer, which may be either reading out or reading in of new information on data bus 88 through application of appropriate pulses on array address line 76 the addressed shift register must be resynchronized with the other shift registers in array 90. The addressed shift register is therefore again shifted until the IPC 118 and the specific position counter 128 again match each other. As before, IPC 118 is incremented via IPC contents-refresh line 112, as long as the memory BSM 60 is under control of control unit 25.

Transfer of information identifying the location undergoing refresh from IPC 104 to IPC 118 has been described as a serial transfer. A parallel interconnection arrangement could be provided. However, since the time required for transfer of this information is relatively small when compared to the time required to shift the contents of the memory array 90 to the address desired, no significant time is lost by a serial transfer.

It should now be apparent that an asynchronously operated memory system capable of achieving the stated objects of the invention has been provided. Unless an access is taking place, the memory units of the system exercise independent refresh control to prevent loss of information stored in them. This independent refresh can be adjusted in accordance with the refresh requirements of the particular memory unit. Therefore, different memory units can have different refresh intervals based on differences in their environment and additional memory units can be added to existing systems at a later time without modifying the system common interface, or processor, and without limiting the additional units on the basis of the capabilities of the existing units.

While the invention has been particularly shown and described with reference to preferred embodiments thereof, it will be understood by those skilled in the art that various changes in form and details may be made therein without departing from the spirit and scope of the invention.

What is claimed is:

1. An asynchronous memory system comprising:

A. a plurality of memory units of a given type having timing characteristics that vary from one to another of the units, B. independent memory unit timing means controlling each memory unit, the timing characteristic of each of said timing means being determined by a timing characteristic of the particular memory unit being controlled by it, C. a common interface, interacting selectively at different times with one of said memory units, to which said memory units are connected, and D. means responsive to said timing means for determining availability of a particular memory unit to said common interface.

2. The system of claim 1 wherein said memory units are dynamic storage memories and at least one of the timing characteristics of said memories is their refresh interval.

3. The system of claim 2 in which said memories are random access memories and said means for determining availability of a particular memory unit indicates to said common interface the refresh status of said particular memory unit when access is desired.

4. The system of claim 2 in which said memories are recirculating storage shift register memories and said means for determining availability of a particular memory unit determines where within the recirculating storage information to be accessed is located.

5. The system of claim 1 wherein said common interface is a central processing unit of a data processing machine containing said memories.

* * * * *